United States Patent
Jeong

Patent Number: 5,819,211
Date of Patent: Oct. 6, 1998

[54] ADAPTIVE TRANSFORM ACOUSTIC CODING CIRCUIT FORMED IN A SINGLE APPLICATION SPECIFIC INTEGRATED CIRCUIT OF A MINI DISK SYSTEM

[75] Inventor: Seong-Hyun Jeong, Ahnsan, Rep. of Korea

[73] Assignee: Samsung Electronics Co., Ltd., Kyungki-do, Rep. of Korea

[21] Appl. No.: 607,008

[22] Filed: Feb. 26, 1996

[30] Foreign Application Priority Data

Mar. 16, 1995 [KR] Rep. of Korea ............ 5463/1995

[51] Int. Cl.⁶ ............................................. G10L 3/02
[52] U.S. Cl. ............... 704/204; 704/229; 704/500; 369/60
[58] Field of Search ............... 395/2.12–2.15, 395/2.35–2.38, 2.09, 2.1, 2.91–2.95; 369/60; 704/504

[56] References Cited

U.S. PATENT DOCUMENTS

| | | | |
|---|---|---|---|
| 4,896,356 | 1/1990 | Millar | 395/2.14 |
| 4,955,037 | 9/1990 | Anderson et al. | 375/244 |
| 4,972,484 | 11/1990 | Thiele et al. | 395/2.36 |
| 5,159,636 | 10/1992 | Rogalski | 395/2.91 |
| 5,301,205 | 4/1994 | Tsutsui et al. | 375/200 |
| 5,410,525 | 4/1995 | Yokota | 369/32 |
| 5,483,515 | 1/1996 | Cheng et al. | 369/124 |
| 5,586,193 | 12/1996 | Ichise et al. | 381/106 |
| 5,664,056 | 9/1997 | Akagiri | 704/229 |

OTHER PUBLICATIONS

Manual Update, TMS320C25 Users Guide.

*Primary Examiner*—David R. Hudspeth
*Assistant Examiner*—Donald L. Storm
*Attorney, Agent, or Firm*—Sughrue, Mion, Zinn, Macpeak & Seas, PLLC

[57] ABSTRACT

The present invention relates to an adaptive transform acoustic coding circuit capable of ensuring the reliability of decoded audio data. The adaptive transform acoustic coding circuit is employed in a mini disc system, and includes a demultiplexer for inputting and demultiplexing a bit stream of an audio signal applied to the mini disk system; a word reconstruction unit for receiving the output of the demultiplexer, extracting and compressing audio spectrum data; a synthesis unit for extending data compressed at a word reconstruction unit for each of low, middle and high bands of the audio spectrum data and synthesizing the extended data; and an error removing unit for receiving a portion of the output of the demultiplexer and providing error removing data to the word reconstruction unit and the synthesis unit.

3 Claims, 5 Drawing Sheets

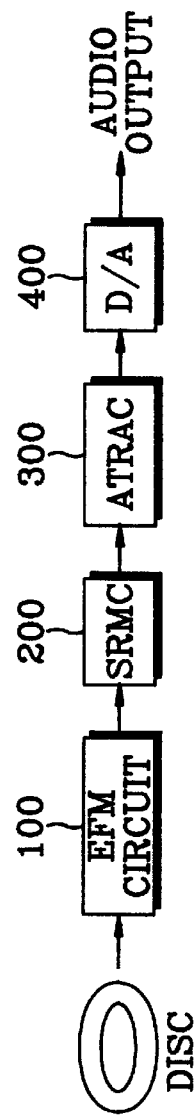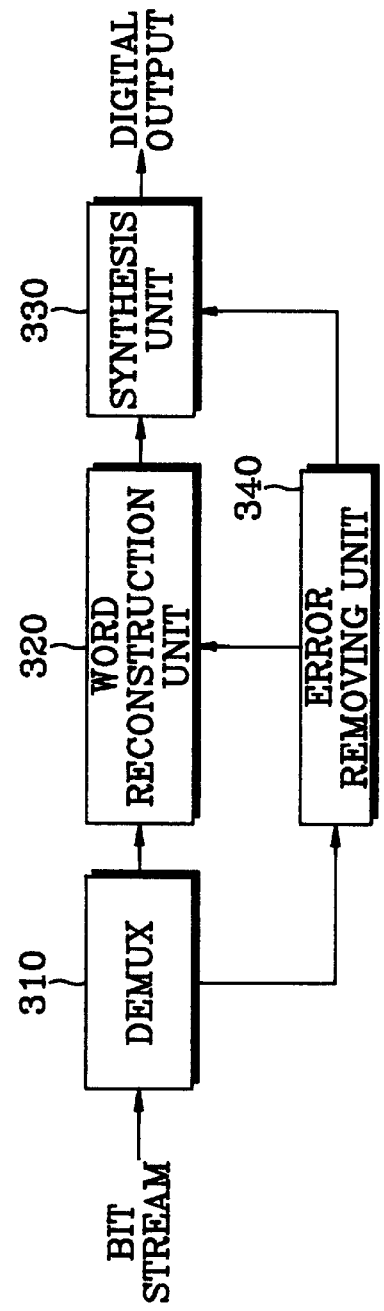

ADAPTIVE TRANSFORM ACOUSTIC CODING CIRCUIT FORMED IN A SINGLE APPLICATION SPECIFIC INTEGRATED CIRCUIT OF A MINI DISK SYSTEM

BACKGROUND OF THE INVENTION

1. Field of the Invention

The present invention relates to an adaptive transform acoustic coding circuit (hereinafter, referred to as an ATRAC) for extending audio data compressed by a mini disc (hereinafter, referred to as an MD) decoding system and outputting the extended data to a digital-to-analog converter (hereinafter, referred to as a D/A converter).

The present application for an adaptive transform acoustic coding circuit, is based on Korean application No. 5463/1995 which is incorporated herein by reference for all purposes.

2. Description of the Related Art

FIG. 1 is an overall block diagram generally illustrating an MD decoding system to which the present invention is adapted. As shown in FIG. 1, the MD decoding system includes an eight-to-fourteen modulator (hereinafter, referred to as an EFM) circuit 100 for EFM modulating data read from the MD, reading the EFM modulated signal and performing an added-on cross-interleave Reed-Solomon coding (hereinafter, referred to as ACIRC) error decoding operation, a shock resistance memory control 200 (hereinafter, referred to as SRMC) having a SRMC function capable of sustaining an impact of the MD, an ATRAC 300 for extending the audio data compressed by the MD decoding system, and a D/A converter 400.

In such an MD decoding system, the ATRAC has an effect on the quality of the audio data output from the decoding operation. Since it is employed in an MD system, the ATRAC requires simple parts which are small in size. That is, the ATRAC for an MD system requires parts having a size more compact than similar parts of a conventional ATRAC.

In the conventional MD decoding system, it is difficult to form the decoding circuit in an application-specific integrated circuit (ASIC) due to problems caused by embodying the MD decoding circuit within an ASIC.

SUMMARY OF THE INVENTION

It is therefore an object of the present invention to provide an adaptive transform acoustic coding circuit for solving the foregoing problems.

It is another object of the present invention to provide an adaptive transform acoustic coding circuit capable of ensuring the reliability of decoded audio data.

It is a further object of the present invention to provide an adaptive transform acoustic coding circuit having a compact size by embodying an MD decoding circuit within a single integrated circuit, or chip, such as an ASIC.

These and other objects can be achieved according to the principles of the present invention with an adaptive transform acoustic coding circuit connected between a SRMC and a D/A converter, comprising: a demultiplexer for inputting a bit stream and demultiplexing the input bit stream; a word reconstruction unit for receiving the output of the demultiplexer and extracting audio spectrum data; a synthesis unit for extending data compressed by the word reconstruction unit for each band and synthesizing the extended data; and an error removing unit for receiving a portion of the output of the demultiplexer and providing error removing data to the word construction unit and the synthesis unit.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar elements components, wherein:

FIG. 1 is an overall block diagram illustrating an MD decoding system to which the present invention is adapted;

FIG. 2 is a detailed block diagram illustrating the ATRAC shown in FIG. 1;

DETAIL DESCRIPTION OF THE PREFERRED EMBODIMENT

Figure 3:
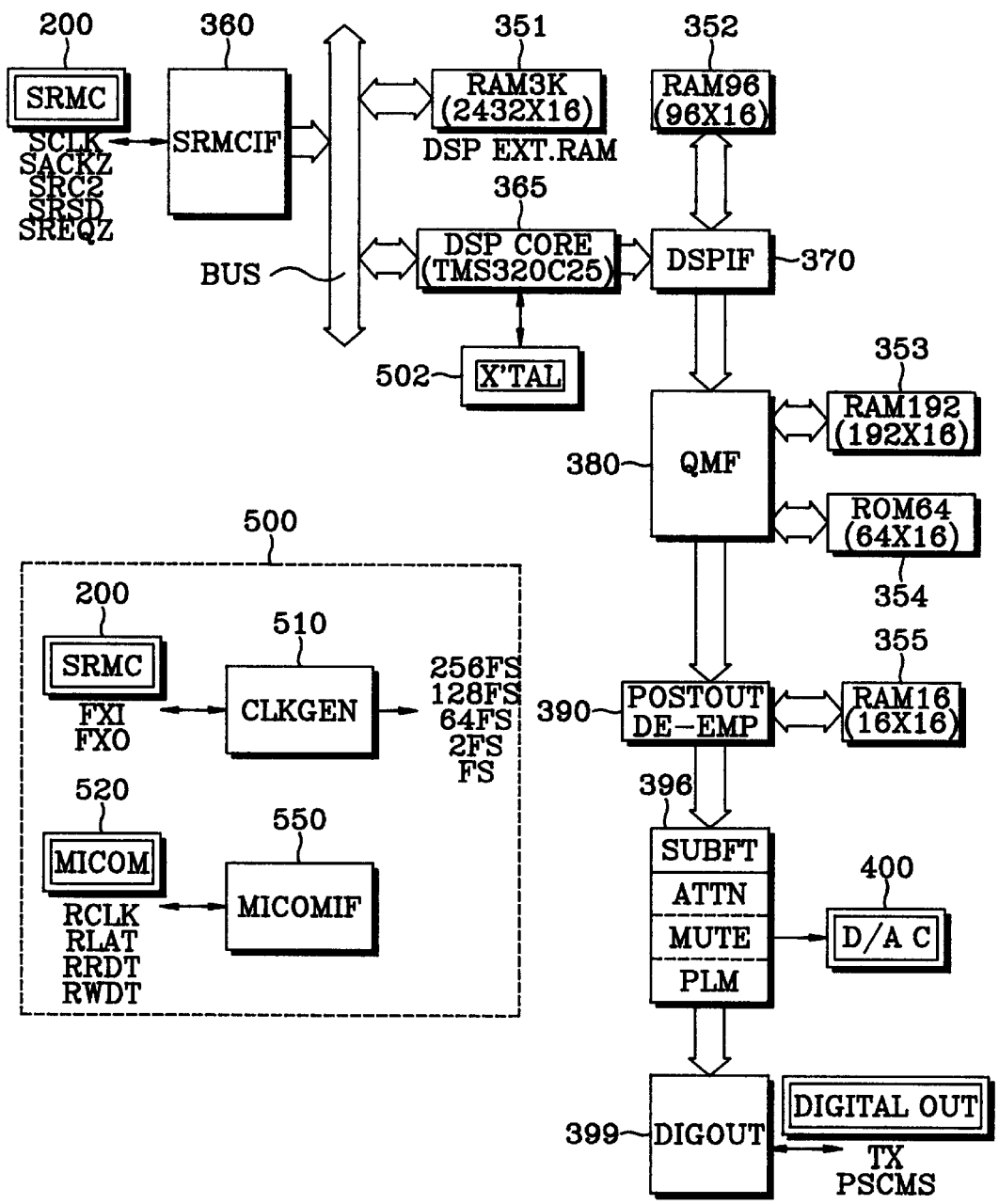
FIG. 3 is an overall detailed block diagram illustrating an ATRAC constructed according to the principles of the present invention.

It should be noted that like reference numerals are used for like elements or parts even though they may be displayed in a separate drawing. Further, in the following description, numerous specific details such as particular components and algorithms for the specific circuits are set forth to provide a more thorough understanding of the present invention. It will be apparent, however, to one skilled in the art that the present invention may be practiced without these specific details. Furthermore, the detailed description of known functions and construction details unnecessarily obscuring the subject matter of the present invention is avoided in the following description.

While the present invention will be particularly shown and described in the following detailed description, it will be understood by those skilled in the art that various changes in form and details may be effected therein without departing from the spirit and scope of the present invention. In particular, while the present invention is illustrated with respect to an audio system, it is possible to adapt the method of the present invention to other systems. Therefore, it should be understood that the present invention is not limited to the specific embodiments described in this specification.

FIG. 2 is a detailed block diagram illustrating the ATRAC 300 shown in FIG. 1. As shown in FIG. 2, the ATRAC 300, which extends audio data compressed from a bit stream output from SRMC 200 shown in FIG. 1 and extracts audio spectrum data, is comprised of a demultiplexer 310, a word reconstruction unit 320, a synthesis unit 330 and an error removing unit 340. With reference to FIG. 2, demultiplexer 310 inputs and demultiplexes the bit stream from SRMC 200. Word reconstruction unit 320 receives the output of demultiplexer 310 and extracts the audio spectrum data. Synthesis unit 330 extends the data compressed by word reconstruction unit 320 for each band and synthesizes the extended data. Error removing unit 340 receives a portion of the output of demultiplexer 310 and provides error removing data to word construction unit 320 and synthesis unit 330. Also, synthesis unit 330 provides to a D/A converter 400 the audio data output through an inverse modified discrete cosine transform (hereinafter, referred to as IMDCT) and a quadrature mirror filter (hereinafter, referred to as QMF) 380.

FIG. 3 is a detailed block diagram illustrating an ATRAC constructed according to the principles of the present invention. Turning to FIG. 3, an SRMC interface (hereinafter, referred to as SRMCIF) 360 receives serial data from the SRMC 200 and converts the received serial data into parallel data. Here, the converted data is stored through a bus in a random-access memory (hereinafter, referred to as RAM) RAM3k 351. A digital signal processor (hereinafter, referred to as DSP) CORE 365 is employed, which can be embodied as a digital signal processing processor, such as a "TMS320C25" made by Texas Instrument Ltd. A digital signal processor interface (hereinafter, referred to as DSPIF) 370 reads data, required for a QMF process, into DSP CORE 365, stores the read data in a RAM96 352 and transmits the stored data to QMF 380, which performs a QMF filtering operation. A postout & de-emphasis unit 390 formats for D/A interfacing the data which completed the QMF process. A sub-function (hereinafter, referred to as SUBFT) 396 performs service functions such as attenuation, mute and peak level check. A digital output (hereinafter, referred to as DIGOUT) unit 399 outputs the digital data received from SUBFT 396.

Figure 4:
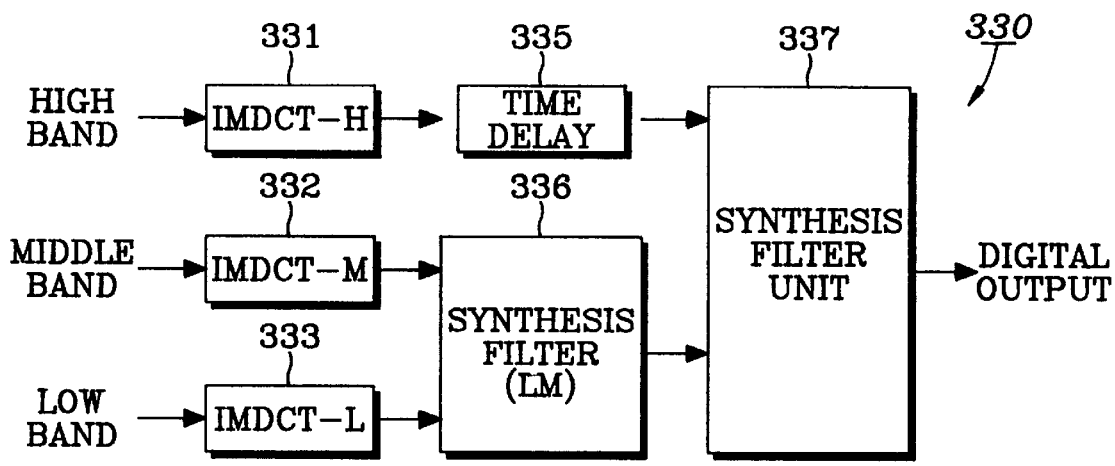
FIG. 4 is a block diagram illustrating the synthesis unit shown in FIG. 3.

FIG. 4 is a detailed block diagram illustrating synthesis unit 330 shown in FIG. 2. With reference to FIG. 4, three IMDCTs, i.e. an IMDCT-H (IMDCT for a high band) 331, an IMDCT-M (IMDCT for a middle band) 332 and an IMDCT-L (IMDCT for a low band) 333, convert the input audio spectrum data into a time sequence signal for each band, each of which has input a high band, a middle band and a low band, respectively. A time delay 335 is connected to the signal output of IMDCT-H which delays the signal for a predetermined amount of time. A synthesis filter 336 and a synthesis filter unit 337 share the same type of filter structure and filter coefficient data. Therein, the synthesis filter 336 is represented by a 48 tap FIR filter, for example, the QMF.

Referring again to FIG. 3, the DSP CORE 365, glue logic and a memory are required for achieving the ATRAC decoding operation in the ASIC chip where the ATRAC decoding system may be embodied. Moreover, a circuit for the ATRAC decoding operation as well as functions such as the attenuation, mute, peak level metering, de-emphasis, and digital output are additionally supplemented to the above mentioned glue logic.

Figure 7A:
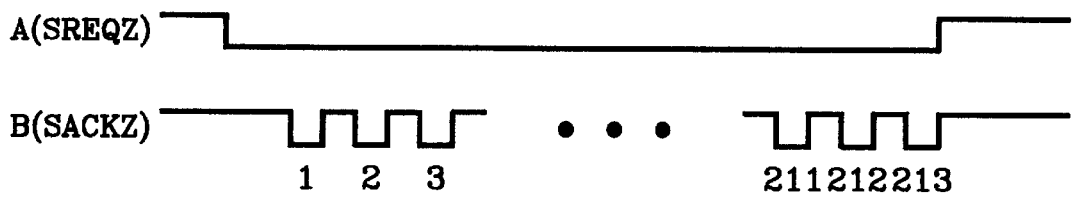
FIGS. 7A to 7H are timing diagrams of signals present at points within the circuit shown in FIG. 3.

The SRMCIF 360 is for interfacing with the SRMC 200, which converts the serial data input from the SRMC 200 into parallel data, and stores the converted data in RAM3k 351 which shares the converted parallel data with DSP CORE 365. The overall operations of this chip can be performed by the DSP CORE 365. Here, if a data transmission request signal SREQZ is output by the DSP CORE 365 to SRMC 200, the SRMCIF 360 serially transmits the data from the SRMC 200. At this moment, the transmitted signal is input bit by bit according to a bit clock and a byte clock. A SACKZ signal is input for latching bits in intervals of eight (i.e., a byte). The above described operation is represented by waveforms A and B of FIG. 7A, where 213 byte SACKZ clock pulses are input during a low interval of the data transmission request signal SREQZ and a final byte is L&R channel data.

Figure 7B:
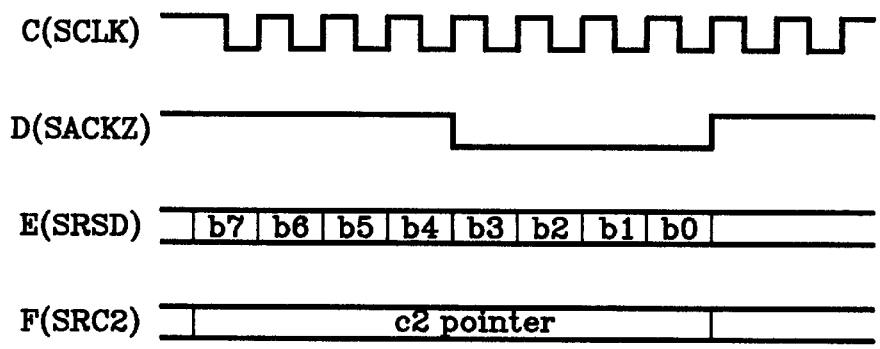

In addition, waveforms C, D, E and F of FIG. 7B illustrate the input timing of the serial data and a c2 pointer. Here, the low interval of the data transmission request signal SREQZ waveform has a maximum duration of 0.4 ms, during which input of the serial data and the c2 pointer in the SRMC 200 should be completed. However, unless 213 byte clock pulses are input because of including the data and a channel byte, an error plug is generated, thereby forcibly enabling the data transmission request signal SREQZ to be disabled.

The TMS320C25 signal processor is exemplary of the DSP CORE 365, as shown in FIG. 3, in which an input clock utilizes an external-chip oscillator 502 having a frequency of 55MHZ. Also, the demultiplexer and the IMDCT of the ATRAC algorithm are embodied to operate in real time by using RAM3K 351. The data produced from the IMDCT process is read in RAM3k 351 based on a data request interrupt, to thus be output to DSPIF 370.

Figure 7C:
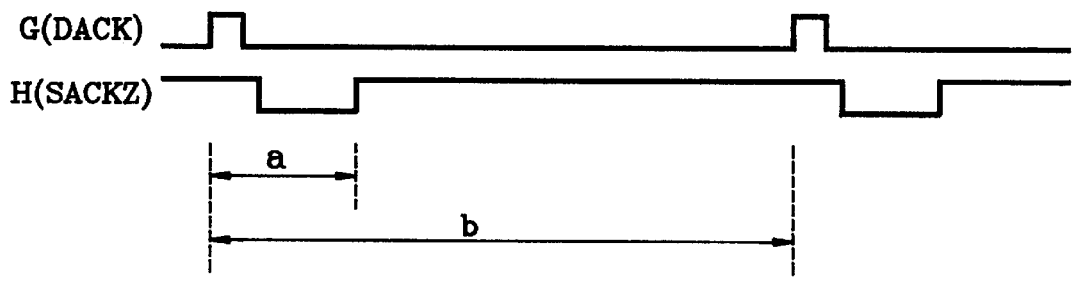
Figure 7D:
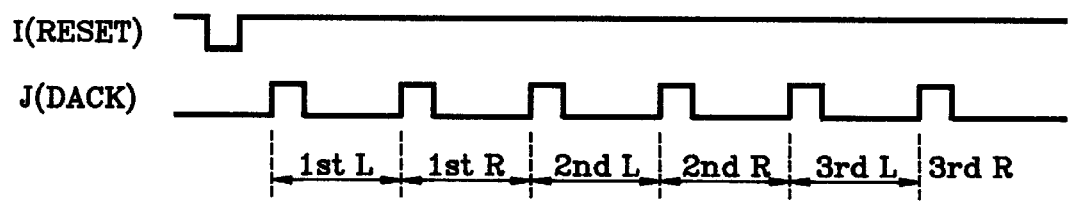

ATRAC decoding is performed in units of a data block. Thus, after a block start signal DACK is generated, as shown by waveform G in FIG. 7C, the DEMUX process and the IMDCT process are performed during the interval between a 0.4 ms interval and a 5.4 ms interval, i.e., during the interval for receiving the data compressed at the SRMC 200. Each of the intervals corresponds to the interval a and interval b, respectively, shown by waveform H in FIG. 7C. Next, the data is transmitted to QMF 380 by an interrupt of the DSPIF 370 so as to perform the QMF process. Since ATRAC decoding is performed for two channels at the same time, the timing diagram shown by waveform J in FIG. 7D is produced after a RESET signal occurs, which is shown by waveform I in FIG. 7D. The DEMUX process and the IMDCT process are performed in units of a block. Here, block data on which processing has been completed is normally output according to an interrupt upon completion of processing data from two channels, i.e., left (L) and right (R) channels.

The DSPIF 370 generates an interrupt to the DSP CORE 365 in order to obtain the data stored in RAM3k 351, so that the data used in the IMDCT process, performed in the DSP CORE 365, can be used in the QMF process.

QMF 380 corresponds to a filter for processing three frequency bands, and it receives data from the three bands as the result of an interrupt. That is, QMF 380 receives 1 word of low band data, 1 word of middle band data and 2 words of high band data. It stores the 2 words of high band in RAM96 352 for purposes of delay, and inputs the 1 word of low band data and the 1 word of middle band data. Also, the data comprised of the 2 words of high band data for the QMF process is input as 24 tap delayed data to QMF 380 and stored in RAM96 352. Therefore, the 2 words of high band data input to DSP CORE 365 are stored in RAM96 352 via the DSPIF 370, the 2 words of high band data previously delayed by 24 taps at RAM96 352 are read in order to output the high band 2 words to QMF 380, and the 1 word of low band data and the 1 word of middle band data input soon thereafter in DSP CORE 365, are output to QMF 380. The synthesis filter 336, shown in FIG. 4, receives the 1 word of low band data and the 1 word of middle band data and outputs 2 words. The synthesis filter unit 337 receives the 2 words output from synthesis filter 336 and the 2 words of high band data through time delay 335, and outputs 4 words. Here, the synthesis filter 336 and the synthesis filter unit 337 have the same internal filter structure as each other.

Figure 5:
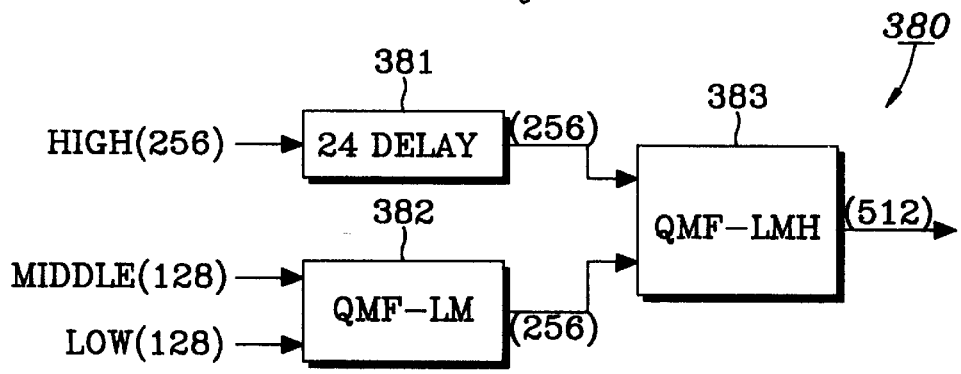
FIG. 5 is a block diagram illustrating one of the channels of the quadrature mirror filter (QMF) shown in FIG. 3.

FIG. 5 is a detailed block diagram illustrating only a single channel of the QMF 380 shown in FIG. 3. When the 128 low band words, 128 middle band words and 256 high band words are input during a 1 data block interval, a quadrature mirror filter for the low and middle bands (hereinafter, referred to as QMF-LM) 382 inputs and synthesizes the low and middle bands, respectively, thereby outputting 256 words. The 256 high band words pass through 24 delay 381 and the 256 words output from the QMF-LM 382 are finally synthesized by a quadrature mirror filter for low, middle and high bands (hereinafter, referred to as QMF-LMH) 383 and are output as 512 words. Since the structure of FIG. 5 is for only a single channel, it is understood that 1024 words are output in a 1 data block interval for two channels.

Figure 7E:
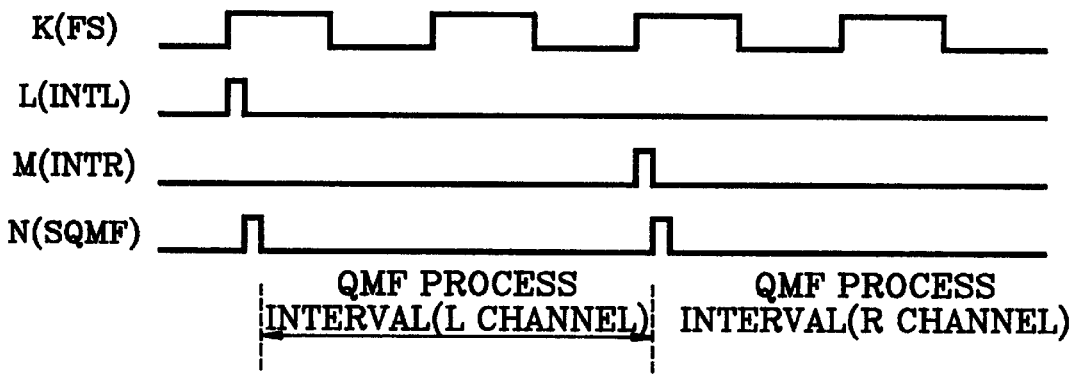
Figure 7F:
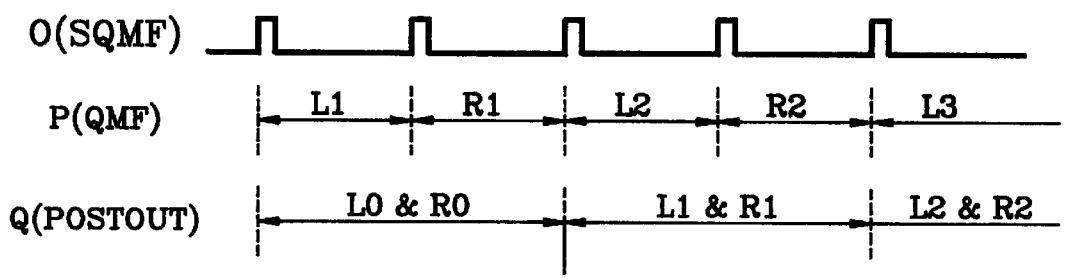

In the preferred embodiment for filtering two channels, i.e., L and R channels, memories 353 and 354 are provided externally from QMF 380. In this instance, a function corresponding to a filter tap of QMF-LM 382 and QMF-LMH 383 can be performed by a RAM192 353. Likewise, a filter coefficient is stored at a RAM64 354. In such a case, the filtering operation begins by inputting to QMF 380 the 1 low band word, the 1 middle band word, and the 2 high band words delayed by 24 taps, each of which are input to DSPIF 370 shown in FIG. 3. As a result, QMF-LM 382 synthesizes the low and middle bands and thus, outputs 2 words. QMF-LMH 383 synthesizes the 2 words which are output from QMF-LM 382 and the 2 high band words output through delay 381, and outputs 4 words. The filtering process interval is shown in waveforms K, L, M and N of FIG. 7E. Once 4 words are input to QMF 380 via the interrupt, as shown by waveform F in FIG. 7B, QMF 380 performs the QMF-LM and QMK-LMH processes in a QMF process interval, as shown by waveform N in FIG. 7E. QMF 380 then outputs 4 words to postout & de-emphasis unit 390 of FIG. 3. Here, the 4 words output are divided into 2 words for the purpose of filtering the L and R channels so that the interrupt of DSP CORE 365 can correspond with the L and R channels. The reason for filtering the L and R channels in conformity with a frame synchronous signal FS, as shown by waveform K in FIG. 7E, with no QMF process in units of a data block, is to match the output with D/A converter 400.

Postout & de-emphasis unit 390 of FIG. 3 is provided to format the data so as to apply the data output from QMF 380 to D/A converter 400. In other words, inasmuch as the data unit in QMF 380 operates on each channel, and the input of the D/A converter 400 is applied to the L and R channels in turn, a RAM16 355 is employed to mix the data of the L and R channels. With respect to waveforms O, P and Q shown in FIG. 7E, 4 words of L channel data are calculated during a L1 interval, i.e., during a first interval of waveform N (SQMF), 4 words of R channel data are calculated during an R1 interval, i.e., during a second interval of waveform N (SQMF), and the calculated data is stored in RAM16 355. As previously mentioned, in the case where each of the L and R channels is separately calculated, postout & de-emphasis unit 390 outputs LO and RO data in conformity with frame synchronous signal FS, the calculation of each already having been completed. L1 and R1 data which has already been calculated is output from postout & de-emphasis unit 390 while the QMF calculations for the next L2 and R2 channels are being performed.

Figure 6:
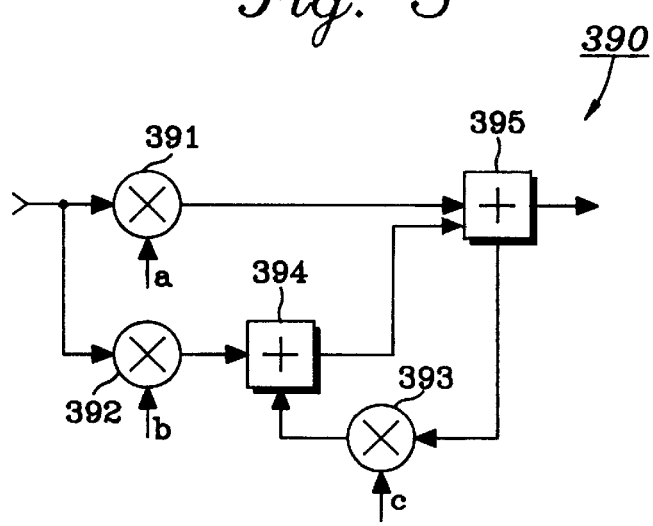
FIG. 6 is a block diagram illustrating the postout & de-emphasis unit shown in FIG. 3.
Figure 7G:
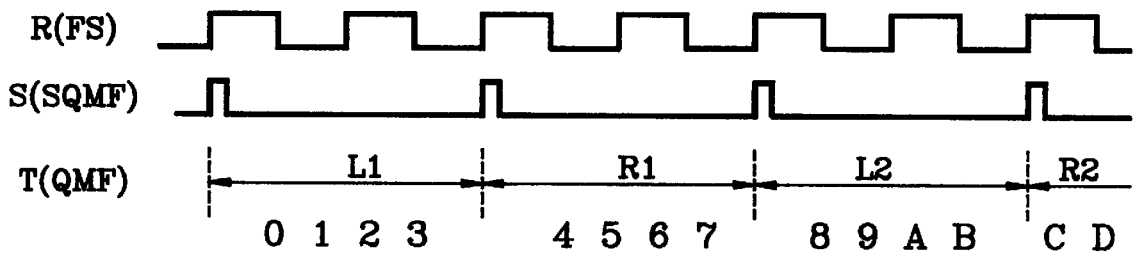

In the event that the data output during the L1 and R1 intervals is stored in RAM16 355 according to waveforms R, S and T shown in FIG. 7G, the data is output to postout & de-emphasis unit 390 in a sequential order, i.e., 0, 4, 1, 5, 2, 6, 3, 7, 8, C, 9, D, A, E, B and F. At this point, a de-emphasis filter function is additionally provided in the postout & de-emphasis unit 390, in which the de-emphasis operation is performed. The de-emphasis structure of the postout & de-emphasis unit 390 is illustrated in FIG. 6 which is comprised of a first multiplier 391 for multiplying data input with a multiplication coefficient a, a second multiplier 392 for multiplying the data input with a multiplication coefficient b, a third multiplier 393 for multiplying returned sum data with a multiplication coefficient c, a first adder 394 for adding the data output from second multiplier 392 to the data output from third multiplier 393 and a second adder 395 for adding the data output from first multiplier 391 and the data output from first adder 394, thereby providing de-emphasized output data.

Figure 7H:
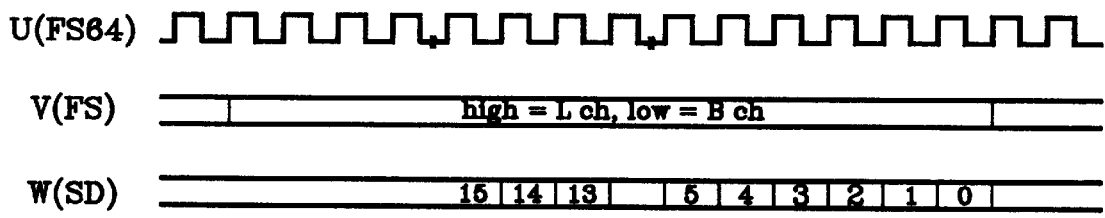

In FIG. 3, the SUBFT unit 396 receives pulse code modulation (hereinafter, referred to as PCM) data output from postout & de-emphasis unit 390, performs operations corresponding to many types of sub-functions. For example, SUBFT unit 396 is comprised of an ATTN unit for attenuating the received PCM data by −6dB, a peak level meter (hereinafter, referred to as PLM) for detecting a peak level of each of two channels and a MUTE unit for muting the data output to D/A converter 400. The SUBFT unit 396 outputs an interface signal to D/A converter 400 and converts parallel data which is input to it into serial data, thereby outputting the converted data. For a digital output interface, SUBFT unit 396 transmits the PCM data to a DIGOUT unit 399, and then receives the next digital output data. D/A converter 400 serially outputs 16 bits starting from a most significant bit MSB, for a period corresponding to half the duration of the frame synchronous (FS) signal. The foregoing can be best understood with reference to waveforms U, V and W shown in FIG. 7H. The PLM obtains a value for each of two channels and also the peak level for every sample after the power is turned on. Next, when a microcomputer (hereinafter, referred to as MICOM) 520 completes a peak level read operation, a level register is cleared. A zero-cross mute and a fade-out mute are representative examples of the muting function. Preferably, a zero-cross window interval is a 32 sample interval for performing the zero-cross mute operation and a window interval for the fade-out mute is a 16 sample interval. A first sample interval is a 2 word interval for the L and R channels of 16 bit audio data, at a frame synchronous interval. In the meantime, the fade-out mute processes, for processing the 16 samples, are comprised of 4 steps, as follows. That is to say, the first 4 samples are equal to −6dB and the second 4 samples are equal to −12dB, the third 4 samples are equal to −18dB, and the fourth 4 samples are equal to −24dB.

The DIGOUT unit 399 provides a digital output of the PCM audio data. First, DIGOUT unit 399 receives the 16 bit PCM data from SUBFT 396 and outputs the received data in conformity with a digital output format. The format corresponds to SYNC (4)+AUX (8)+PCM AUDIO DATA (16)+CONTROL (4), where the numbers in the parenthesis are the number of bits in that field of the format. A microcomputer interface (hereinafter, referred to as MICOMIF) 550 provides a serial interface for the read/write operation for various types of plug registers and it provides for overall control via an external control component. In the meantime, a clock generator 510 generates various types of clock signals for use internally within the system, and it provides a control signal for overall operation of the system.

The overall operation of FIG. 3 is controlled by MICOM 520, in which if the decoding operation is started, MICOM 520 causes a transmission request signal to be sent from the DSP CORE 365 to the SRMC 200. Then, the MICOM 520 causes the compressed serial data to be transmitted from SRMC 200, the serial data to be converted into parallel data in SRMCIF 360, and the converted data to be stored in RAM3K 351. Next, in DSP CORE 365, MICOM 520 causes the data compressed at the RAM3K 351 to be extended and causes the DEMUX and IMDCT processes to operate, thereby storing the result back into RAM3K 351. For the QMF process, MICOM 520 causes DSPIF 370 to generate the interface signal and to receive the data for input to QMF 380, to directly transmit the low and middle band data to QMF 380, to store the high band data in RAM96 352, thereby delaying the stored data for 24 taps and again transmitting the delayed data to QMF 380. Accordingly, MICOM 520 mixes L and R channel data and outputs the result in order to perform the filtering operation in QMF 380 and to output to D/A converter 400 the result for each band. Finally, prior to being output to D/A converter 400, the data is operated on by functions such as attenuation, mute, and the peak value detection in SUBFT 396, and the results are then provided to D/A converter 400. Additionally, the data is output in order that it can be converted in DIGOUT unit 399 to conform with the digital audio format.

As is apparent from the foregoing and according to the present invention, the present invention results in the effect of ensuring the reliability of decoded audio data and in the advantage that the decoding circuit of the MD can be made on a single chip, e.g., an ASIC, in order to have a compact size.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An adaptive transform acoustic coding circuit of a mini disc system, comprising:

a conversion unit for converting serial data input to the adaptive transform acoustic coding circuit into parallel data;

a first memory for storing the data converted by said conversion unit;

a signal processing unit for performing an inverse modified discrete cosine transform (IMDCT) process on said data stored in said first memory, and storing the result in said first memory;

a quadrature mirror filter (QMF) for filtering the result of the IMDCT process stored in said first memory and outputting QMF filtered data;

a formatting unit including a postout and de-emphasis circuit for formatting the QMF filtered data, wherein said postout and de-emphasis circuit comprises
   a first multiplier for multiplying an input to said formatting unit with a first coefficient;
   a second multiplier for multiplying said input to said formatting unit with a second coefficient;
   a third multiplier for multiplying a feedback value with a third coefficient;
   a first adder for adding the output of second multiplier to said third multiplier; and
   a second adder for adding the output of said first multiplier with the output of said first adder to provide an output feedback value;

a second memory for storing the formatted data output from said formatting unit;

a subfunction unit for performing at least one of a plurality of subfunctions on the formatted data stored in said second memory; and a digital output unit for outputting the result of the said subfunction unit.

2. The adaptive transform acoustic coding circuit recited in claim 1, wherein said subfunction unit performs at least one of an attenuation function, a peak level meter function and a mute function.

3. The adaptive transform acoustic coding circuit recited in claim 1, wherein the adaptive transform acoustic coding circuit is formed on a single application specific integrated circuit (ASIC).

* * * * *